No. 641,355. Patented Jan. 16, 1900.
J. K. ADAMS.
TIRE TIGHTENER.
(Application filed Nov. 15, 1899.)

(No Model.)

WITNESSES:
Edmund T. Brand
H. A. Daniels

INVENTOR
John K. Adams
BY
Thomas P. Simpson
ATTORNEY

THE NORRIS PETERS CO., PHOTO-LITHO., WASHINGTON, D. C.

UNITED STATES PATENT OFFICE.

JOHN K. ADAMS, OF TONKAWA, OKLAHOMA TERRITORY.

TIRE-TIGHTENER.

SPECIFICATION forming part of Letters Patent No. 641,355, dated January 16, 1900.

Application filed November 15, 1899. Serial No. 737,138. (No model.)

*To all whom it may concern:*

Be it known that I, JOHN K. ADAMS, a citizen of the United States, residing at Tonkawa, in the county of Kay and Territory of Oklahoma, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates generally to metallic tires for vehicle-wheels, and has for its special object to provide means whereby a cut tire may be tightened with ease and convenience, as I will hereinafter describe and claim.

Figure 1:
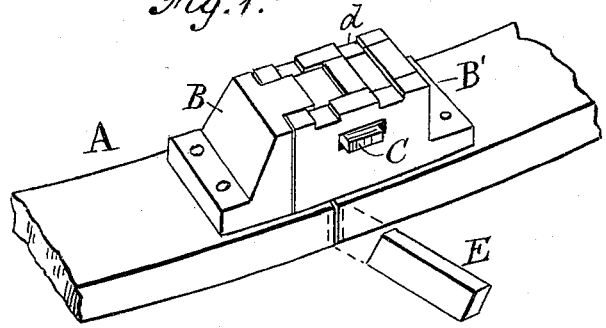
Figure 2:
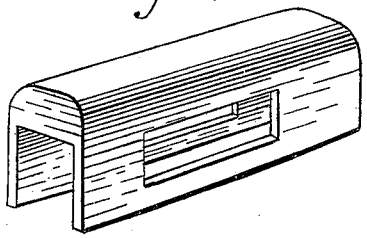
Figure 3:
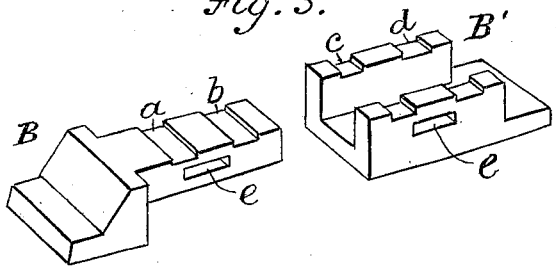

Figure 1 of the drawings shows the device with the hollow felly-section removed; Fig. 2, a detail view of the trough-shaped felly-section with opposite slots through which the keys may be put in or taken out of the coupler, and Fig. 3 is a detail perspective view of the coupler whose two parts are so constructed as to form a tenon-and-socket joint.

In the drawings, A represents a cut tire under whose ends are secured, by screw, bolt, or rivet, a tenon-piece B and a corresponding socket-piece B', the two pieces being placed exactly opposite to each other. Each of the two pieces has a corresponding transverse slot through the middle, the two slots being directly opposite to one another, while on top they are provided with two sets of key-grooves $a\,b$ and $c\,d$. The slots $e\,e$ receive a coupling-key C, which is of less width than the slots $e\,e$, so as to allow sufficient movement of the tenon-piece B to permit the grooves $a\,b$ or $c\,d$ to register and receive the fastening-key. When the grooves $a\,b$ register and receive the key, the ends of the tire abut together and the tire has been tightened on the wheel; but when the grooves $c\,d$ have registered and received the fastening-key D it will be observed that there is a washer E between the ends of the tire. These washers E may be more or less in number to provide for a greater or less number of adjustments or tightenings of the tire. When a tire becomes loose on a wheel, one or more of these washers E may be removed and the coupler keyed up to correspond, as there may be any desired number of the cross-grooves on top of the tenon and socket. By these means I can thus effectually tighten a loose tire on a wheel and do it without expense or loss of time.

Having thus described all that is necessary to a full understanding of my invention, what I claim as new, and desire to protect by Letters Patent, is—

In combination with a cut tire on a vehicle-wheel, a rigidly-secured tenon-piece on one end and a corresponding socket-piece on the other end, the two adapted to form an adjustable tenon-and-socket joint and provided with registering slots by which the two ends of the tire may be brought together by one wedge action and with registering grooves by which keys may hold them together afterward as shown and described.

In testimony whereof I affix my signature in presence of two witnesses.

JOHN K. ADAMS.

Witnesses:
 MAUDE BLAKE,
 A. V. HEMBREE.